Figure 3:
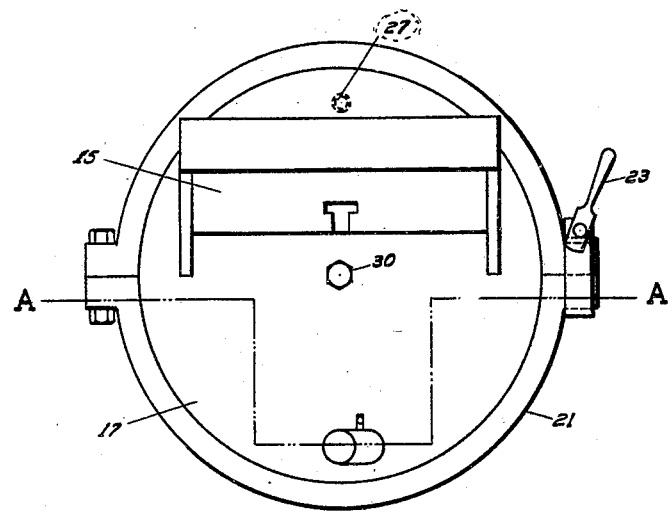

May 3, 1932.  W. M. DUNCAN  1,856,846
FINISHING MACHINE FOR WHEELS, ETC
Filed Jan. 29, 1931   2 Sheets-Sheet 1
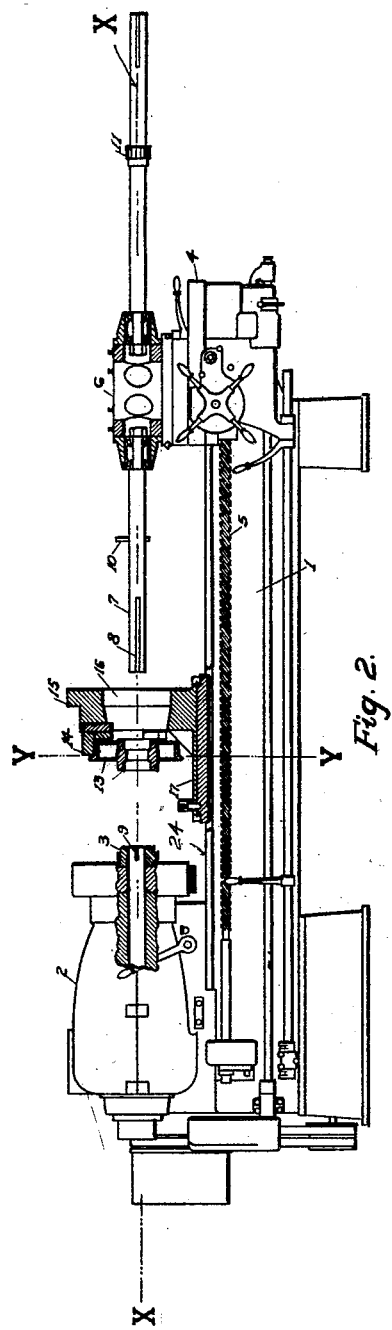
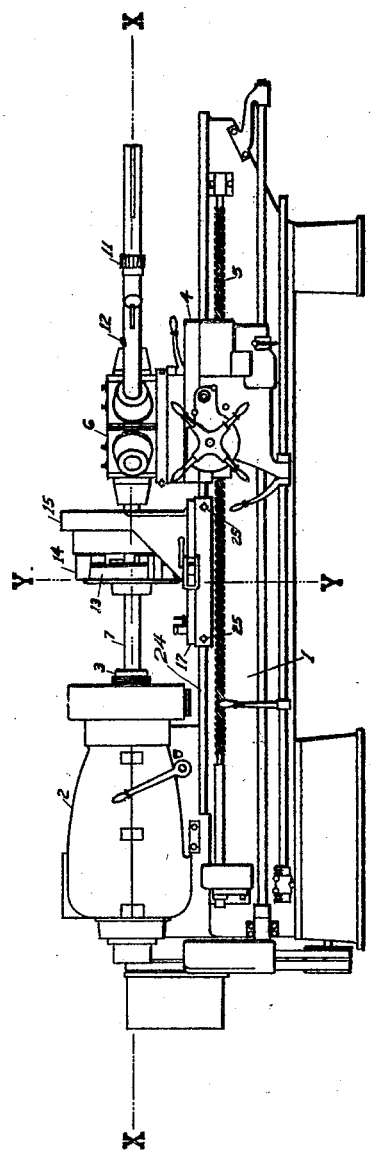
INVENTOR
William M. Duncan
BY
H. M. Plaisted,
ATTORNEY.

May 3, 1932. W. M. DUNCAN 1,856,846
FINISHING MACHINE FOR WHEELS, ETC
Filed Jan. 29, 1931 2 Sheets-Sheet 2

INVENTOR
William M. Duncan
BY
H. M. Plaisted,
ATTORNEY

Patented May 3, 1932

1,856,846

UNITED STATES PATENT OFFICE

WILLIAM M. DUNCAN, OF ALTON, ILLINOIS

FINISHING MACHINE FOR WHEELS, ETC.

Application filed January 29, 1931. Serial No. 512,063.

This invention relates to certain new and useful improvements in finishing machines for boring, reaming and facing wheels and other castings, the peculiarities of which will be hereinafter fully described and claimed.

The main objects of my invention are first, completely to machine a wheel or other casting or work piece in one set up of the latter; second, to bore, ream and face one or more sides of a casting that is fixed in a stationary position, by the use of successively operated multiple rotary tools without disturbing the original set up of the casting; third, to provide means for adjustably holding such castings firmly in various fixed positions for being operated on; fourth, to save labor of rehandling the work piece, obtain accuracy in finishing, and lower the cost of manufacture; and other objects hereinafter described and claimed.

Figure 4:
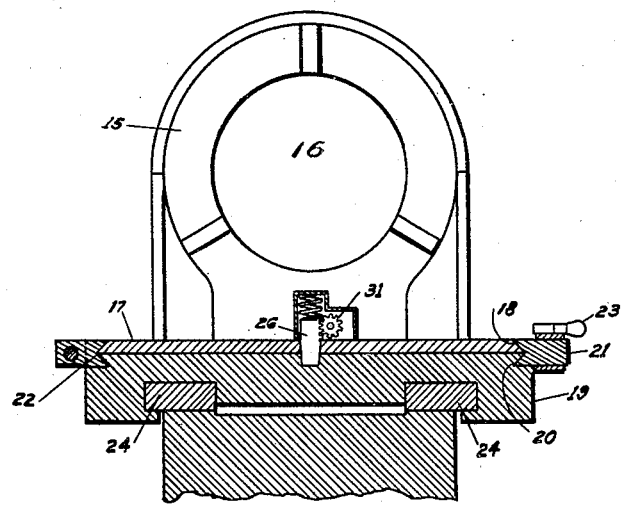

In the accompanying drawings on which like reference numerals indicate corresponding parts, Fig. 1 represents a side elevation of a machine embodying my invention;

Fig. 2, a similar view with parts in section to show the construction;

Fig. 3, an enlarged plan view of a clamp ring for a turntable carrying a rigid fixture and adapted to support a work piece; and Fig. 4, a vertical section of Fig. 3 on the line A—A showing part of the fixed support in elevation, and in section a turntable, clamp ring, turntable base and its mounting on a lathe bed.

The usual method of boring and facing a wheel or other casting is to mount it on a rotary head or in a chuck rotating with the arbor of the head stock, and feed a non-rotary boring or facing tool against the revolving work piece. When one side is faced, the piece is unbolted from the head plate or removed from the chuck, reversed and set up again for facing or counterboring the other side. Such method requires labor and time in rehandling, lessens the accuracy of the finished work, and increases the cost of manufacture.

My construction, however, provides for one set up of the work piece and fixing it in the desired stationary position for being machined by one or more operating tools successively adjusted and rotatively driven in operative contact with said fixed work piece. Also it allows reversing of the work piece and accurately disposing it at 180 degrees or other angle, without disturbing its mounted position in its holder, nor its height relative to the operating tool.

Referring to the drawings, the numeral 1 designates the body of a lathe or other suitable support for a head stock 2 having a rotary arbor 3 driven in the usual or any approved manner.

Mounted opposite the head stock is a carriage 4 adjustable towards and from the head stock by the usual feed screw 5 or other suitable means. Mounted on this carriage is a turret head 6, or other suitable holder for a boring tool 7, preferable in multiple and rotatively mounted in said turret head as shown in section in Fig. 2. One end of each boring tool has a sliding engagement with the driving head arbor, preferably by means of a key way 8 in one end of the operating tool adapted to slidably engage a feather key 9 in the central opening of said arbor. The respective operating tools have suitable portions, such as a facing tool 10, Fig. 2, a rose cutter 11, Fig. 1, and boring cutter 12, Fig. 1, or other suitable attachments for boring, reaming, facing and other operations performed upon the wheel 13 or other work piece. Such work piece is set up in a chuck 14 or otherwise supported by a rigid fixture 15 preferably ring-shaped vertically disposed and having an opening 16 in the axis X of the driving head and operating tool at the time in engagement with the driving head.

This fixture is carried by a horizontal turntable 17, and is preferably offset from the center of the turntable, or otherwise supported so as to bring the work piece in the path of the operating tool. Such preferred turntable is rotatable on a vertical axis Y intersecting the axis X substantially through the wheel or other work piece, as shown in Fig. 2. The peripheral edge of said turntable is beveled outward and downward as shown at 18, Fig. 4, and a turntable base 19 has a reverse bevel 20 of similar diameter as shown in Fig. 4. Mounted on these beveled edges is a clamp ring 21 having a dovetail or other suitable inner edge 22 adapted to match the double bevel of the turntable and its base, or otherwise clamp the turntable upon the base when said ring is tightened thereon by a clamp handle 23 so as to hold the turntable and the fixture carried thereby in a rigid stationary position to avoid chattering of the operating tool engaged at the time with the work piece held in said chuck, or as otherwise mounted on the fixture 15.

The turntable base is preferably adjustable by sliding upon the ways 24 of the lathe bed and fixed in said adjusted position by set screws 25 or otherwise.

A locking device is provided for the turntable upon its base, such as a spring-actuated dowel pin 26, Fig. 4, engaging a tapered hole in the base at such location as to locate the work piece at right angles to the axis X for facing one side of the wheel or other piece. Another similar dowel hole is indicated at 27, Fig. 3, and located 180 degrees from the first named dowel hole, so that corresponding rotation of the turntable will present the opposite side of the wheel in a parallel plane to its first position, for facing accordingly. This dowel is preferably provided with teeth and engaged by a pinion 31 through the mechanical operation of which by hand, the dowel is raised from its registering hole when the turntable is rotatably adjusted as above described.

Other dowel holes may be used at suitable angular locations for locking the table in corresponding angular positions for any desired boring operation upon the work piece being finished.

Thus the locking device and clamp ring respectively locate and firmly fix the turntable and work piece carried by the fixture which latter is preferably integral with the turntable and thus the work piece is fixed in the desired adjusted stationary position.

The turntable is preferably centered upon its base by a king pin 30, Fig. 3.

The height of said ring-shaped rigid fixture on the horizontal turntable as shown, is such that the center of the chuck carried thereon always lies in the horizontal plane through the axis X. Rotating the turntable 180 degrees and locking it will insure the same coincident location of the axis of the chucked work piece in the axis X of the driving head and boring tool, and such reversal of the work piece for counterboring or facing, is quickly and accurately effected by the construction above described.

Thus a wheel, for instance, mounted in the chuck or other holder with its bore in the axis X, can be bored and reamed if necessary by successive tools in said turret head; then the turntable will reverse said wheel and present the opposite side for facing or counterboring or both, without removing the wheel from its holder or disturbing its original set up. Also by the locking device described, the opposite faces of the wheel will be in parallel planes, and the center of the wheel will be maintained at the same height as in the first operation thereon. The saving of resetting the work piece, and doing away with such rehandling and consequent liability of error, results in saving of labor, greatly increased accuracy of finish successively performed upon the wheel or other work piece, and a cheapening of the cost of manufacture.

I do not limit myself to exact construction herein shown and described, except by the appended claims.

I claim:

1. The combination with a lathe bed having a horizontal rotary driving head, and a turret head with horizontal operative tools successively aligned with and engaging said driving head, of a horizontal turntable mounted on the lathe bed between the driving head and turret head and having a vertical rigid ring-shaped fixture carrying a chuck and both having a hole for passage of the operative tool, and means to limit rotation and to clamp the turntable with the axis of the chuck coincident with the axis of the driving head and operating tool when the turntable is rotated to positions 180 degrees apart, substantially as described.

2. The combination with a lathe head having a rotary driving head, and an operative tool slidingly engaging said driving head and mounted on the opposite end of the lathe bed in the axis of said driving head, of a horizontal turntable mounted on the lathe bed adjacent said driving head and having a rigid ring-shaped fixture vertically fixed thereon and offset from the center of the turntable to support a chuck and locate the work piece accurately in said axis of the driving head in rotated positions 180 degrees apart, and locking and clamping means for said turntable in both of said rotated positions, substantially as described.

In testimony whereof I have affixed my signature.

WILLIAM M. DUNCAN.